United States Patent
Dailey et al.

[11] Patent Number: 6,147,294
[45] Date of Patent: Nov. 14, 2000

[54] D-WING DEPLOYABLE SOLAR ARRAY

[75] Inventors: Dean R. Dailey; Lee E. Elliott, both of Torrance, Calif.

[73] Assignee: TRW Inc., Redondo Beach, Calif.

[21] Appl. No.: 09/287,543

[22] Filed: Apr. 6, 1999

[51] Int. Cl.$^7$ .............................. H01L 31/045; B64G 1/44
[52] U.S. Cl. .......................... 136/245; 136/292; 244/173
[58] Field of Search ................................. 136/292, 245, 136/244; 244/173

[56] References Cited

U.S. PATENT DOCUMENTS

| | | | |
|---|---|---|---|
| 3,326,497 | 6/1967 | Michelson | 244/1 |
| 3,473,758 | 10/1969 | Valentijn | 244/1 |
| 3,690,080 | 9/1972 | Dillard | 52/108 |
| 3,976,508 | 8/1976 | Mlavsky | 136/89 |
| 4,713,492 | 12/1987 | Hanak | 136/245 |
| 4,755,231 | 7/1988 | Kurland et al. | 136/244 |
| 5,236,378 | 8/1993 | Newman | 440/6 |
| 5,244,508 | 9/1993 | Colozza | 136/245 |
| 5,433,259 | 7/1995 | Faludy | 160/67 |
| 5,520,747 | 5/1996 | Marks | 136/245 |
| 5,578,139 | 11/1996 | Jones et al. | 136/245 |
| 5,620,529 | 4/1997 | Bassily et al. | 136/245 |
| 5,660,644 | 8/1997 | Clemens | 136/245 |
| 5,833,176 | 11/1998 | Rubin et al. | 244/173 |
| 5,885,367 | 3/1999 | Brown et al. | 136/245 |

*Primary Examiner*—Nam Nguyen
*Assistant Examiner*—Michael C. Miggins
*Attorney, Agent, or Firm*—Michael S. Yatsko; Ronald M. Goldman

[57] ABSTRACT

The power to weight ratio obtained with a spacecraft's solar array (3) is enhanced by a factor of at least two to five through use of support structure for individual solar panels or solar arrays (31a–17a) containing a curved outwardly bowed surface as deployed that packs essentially flat for storage. Defining a D-shaped wing (15a) in cross-section as deployed, the support structure (4 & 6) for a string of solar cells (10, FIG. 3) provides greater inertia and thereby greater rigidity than prior designs. One member (4) to the support structure is relatively flexible. One-hundred and eighty degree strain energy hinges (19) carried by the other support member (6) outwardly bows that flexible to define a curved sector when the support structure is released from the stowed condition in which the support structure is held relatively thin and flat.

19 Claims, 5 Drawing Sheets

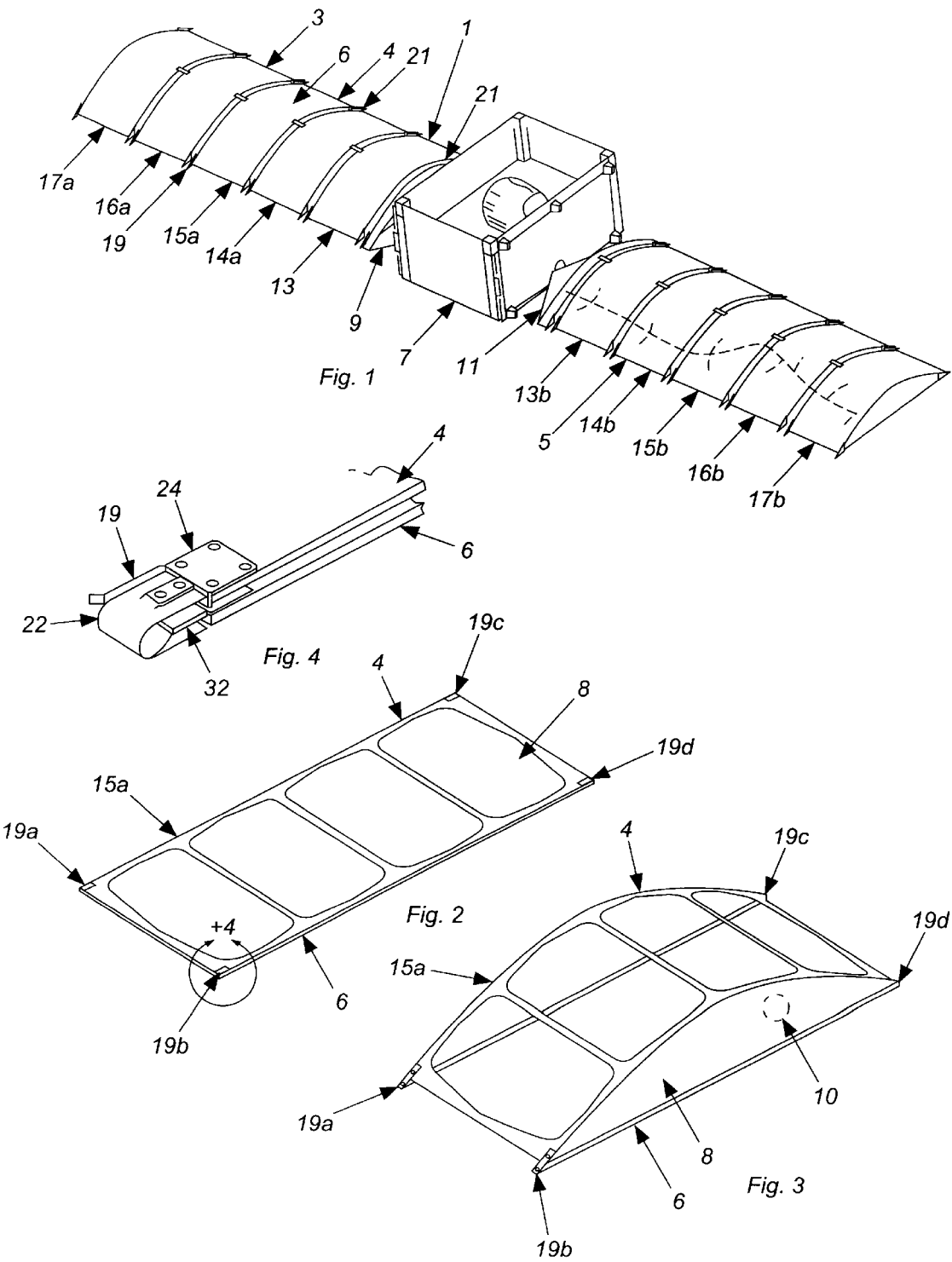

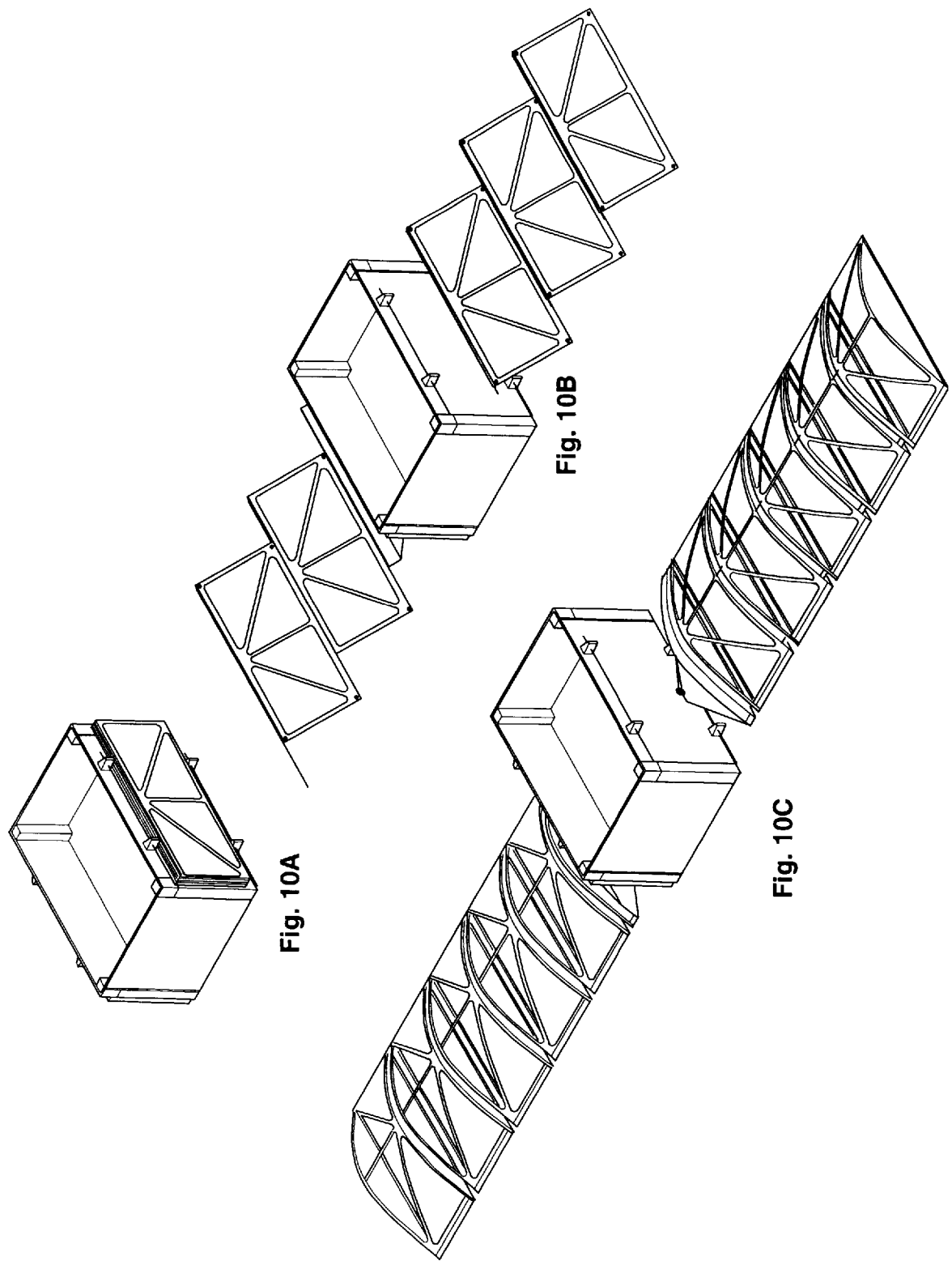

D-WING DEPLOYABLE SOLAR ARRAY

FIELD OF THE INVENTION

This invention relates to solar arrays and, more particularly, to increasing the power to weight ratio obtained in solar arrays.

BACKGROUND

Solar arrays contain large numbers of photovoltaic cells, also called solar cells, that convert energy from incident sunlight into electricity. A major application for the array is for spacecraft in which the solar array is used to recharge the spacecraft's DC batteries. On the array, solar cells are placed on the surface of the array, and are arranged in strings or series of electrical circuits. Those circuits are further connected in parallel to combine the outputs of the solar cells and collectively provide the appropriate levels of current at a sufficient voltage level suitable for charging the spacecraft's batteries. To ensure that the solar array receives sunlight, position control apparatus on the spacecraft track the sun's position and, by using various means, the solar arrays are kept in a position that maximizes the amount of sunlight received.

For spacecraft application, the solar arrays are light weight and are constructed to be deployable. A deployable solar array is formed of a number solar panels in a series. The panels are hinged or joined together, and can be folded up alongside one another for stowage aboard the spacecraft and transport into orbit. In orbit, upon command, the series of panels is unfurled for deployment.

Existing solar panels are flat in structure or, and generally speaking, are two dimensional. As a consequence, the panels are not very rigid. As greater amounts of electrical power are required for the spacecraft, the length and width of those panels also grows in order to accommodate greater numbers of solar cells. As the size of the array increases, the ability of the relatively thin panels to withstand the mechanical loads required to maintain adequate sun tracking decreases. Larger size panels may bend or warp, even under low gravity conditions in which the panels are essentially weightless. As the size of the array increases its inertia also increases. Although it is possible to add structural members, such as booms, to increase the array's stiffness and maintain the straightness of the array, such a modification invariably increases both the array's launch weight and its stowed volume.

Typically, the allowable stowed volume is restricted by the size of the space craft and the launch vehicle. Weight is also an important consideration in spacecraft solar array design. The higher the weight of the solar array, the more fuel is required to launch the spacecraft into orbit. The foregoing factors translate to greater launch cost, which is clearly undesirable.

The solar array's weight efficiency is therefore recognized as an important design factor. For a solar array the weight efficiency is expressed in terms of its power to weight ratio. Typical solar arrays have power to weight ratios ranging from about twenty to fifty watts per kilogram. At such low efficiencies, raising spacecraft power levels using extensions of existing solar array designs carries significant weight penalties.

The present invention has three main objectives. A principal object of the present invention therefore is to increase the power to weight ratio of solar arrays.

A further object of the invention is to enhance electrical power generation on board spacecraft, with minimal or no requirement for increasing launch weight.

An ancillary object of the invention is to increase the moment of inertia and the rigidity of solar arrays in order to increase the array's ability to withstand on orbit maneuvering loads.

SUMMARY OF THE INVENTION

In accordance with the foregoing objects and advantages, the present invention provides a solar array whose moment of inertia and rigidity automatically increases when the array is deployed. The array's support structure changes from a relatively flat two dimensional shape and rectangular cross-section, as stowed, to a curved shape and an airplane wing-shaped cross-section, as deployed. The change of shape significantly increases the $I_{x-x}$ inertia, the moment of inertia, by several orders of magnitude, and rigidity of the support structure and, hence, the moment of inertia and rigidity of the solar array.

With increased rigidity, the support structure is capable of carrying larger numbers of solar cells within the array than with a flat support, permitting generation of greater amounts of electrical power. As an advantage, solar arrays of the foregoing design achieve power to weight ratios two to five times greater than that obtained with conventional space qualified solar array designs.

The foregoing and additional objects and advantages of the invention together with the structure characteristic thereof, which was only briefly summarized in the foregoing passages, becomes more apparent to those skilled in the art upon reading the detailed description of a preferred embodiment of the invention, which follows in this specification, taken together with the illustration thereof presented in the accompanying drawings.

BRIEF DESCRIPTION OF THE DRAWINGS

In the drawings:

FIG. 1 is an isometric illustration of an embodiment of a solar array containing multiple solar panels as deployed in a dual wing solar array assembly;

FIG. 2 is a perspective view of one of the solar panels in the embodiment of FIG. 1, drawn to a larger scale, showing the relatively two-dimensional flat shape of the solar panel and its support as stowed;

FIG. 3 is a perspective view of the solar panel of FIG. 2, shown as deployed in which the panel assumes a relatively three-dimensional flat shape;

FIG. 4 shows a section of the corner of the panel of FIG. 2 in the stowed condition taken at lines 4—4, illustrating in perspective in larger scale one of the 180 degree strain energy hinges used to join the panel sections at the corners of the solar panel of FIGS. 2 and 3;

FIGS. 10A, 10B and 10C respectively illustrate the changing configuration of the solar array as it is deployed, including, sequentially, the stowed configuration, partially deployed configuration and fully deployed configuration.

DESCRIPTION OF THE PREFERRED EMBODIMENTS

Figure 5:
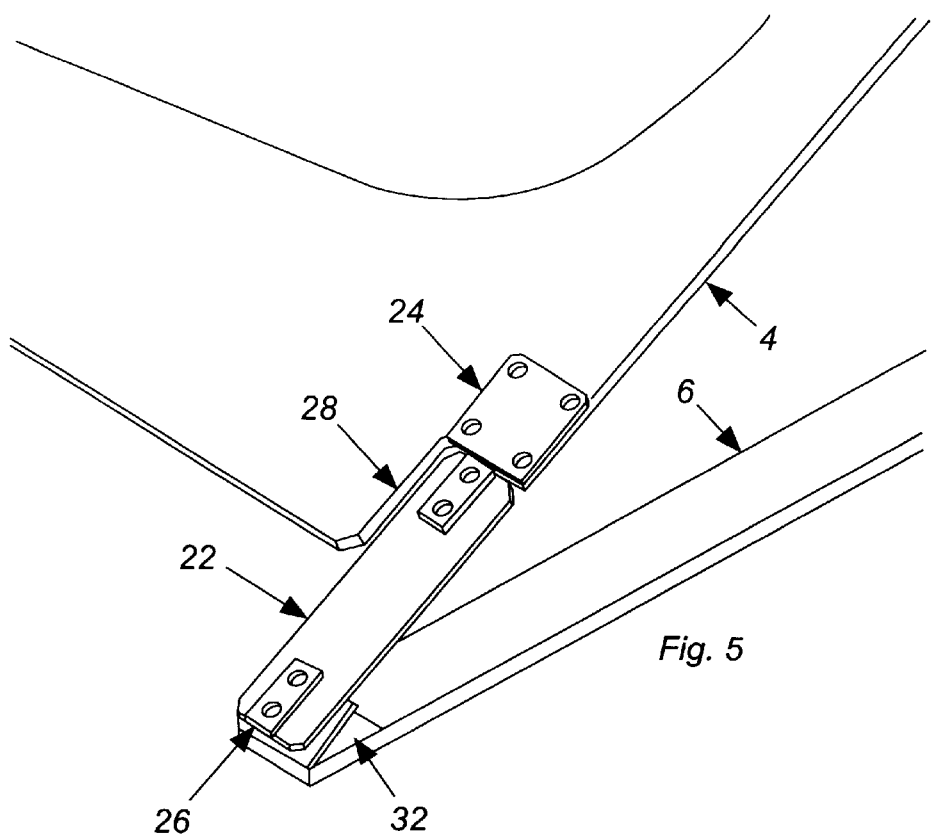
FIG. 5 shows a section of the corner of the panel of FIG. 3 taken at lines 5—5, illustrating in perspective in larger scale the strain energy hinge of FIG. 4, showing the 180 degree strain energy hinge as deployed.

Reference is made to FIG. 1, illustrating in perspective the new solar array as deployed. Solar array 1 contains two arms 3 and 5, also individually referred to as solar array wings, attached on respective opposite sides of a box 7 by appropriate yokes 9 and 11, only one of which is visible in the figure. Solar arrays 3 and 5 extend straight out in opposite directions from opposite sides of box 7, as arms, and, ideally, form in a straight line coaxial with one another. Each array contains five solar panels 13a through 17a in array 3 and 13b through 17b in array 5. The panels include a curved surface, visible in the figure, and a relatively flat underside surface, only partially visible. Each panel is joined to an adjacent panel in the arm by hinges 21, later herein more fully described.

The solar cells, not visible in the figure, are located on the far side of the relatively flat underside surface of each of the members 3 and 5. Electrical cables or harnesses, not illustrated, extend from a connection in the box 7, through respective yokes 9 and 11 to each of the panels in the array, electrically connecting the solar panels to an electrical connector in box 7. The foregoing harness structure and the contents of the box are conventional and are essentially the same as used in all prior solar arrays, the details of which are not necessary to an understanding of the present invention.

Each of the aforementioned panels contains four 180 degree strain energy hinges, 19a through 19d, each of which is located at a respective one of the panel's four corners, later herein described in greater detail. Additional hinges, such as hinge 21, connect the yoke to the first panel and each panel to the next adjacent panel to mechanically link the panels together into the solar array. For convenience only the hinges connected to one of the solar panels are labeled in this figure.

As deployed, each solar panel or solar array vaguely resembles an airplane wing in appearance. That is, the array contains a curved upper surface 4, as seen in panel 15a on the left, and a flat bottom surface 6, seen through a window in surface 4, and in cross section defines a curved D-shaped sector. Those elements are better illustrated in the next figure, FIG. 2 to which reference is made.

One of the panels 15a is taken as representative of the plurality of panels and is illustrated in the undeployed or stowed condition in an enlarged perspective view in FIG. 2. In this condition the panel is flat, with the upper and lower surfaces, which are essentially coextensive in shape and area, pressed against one another. External means, not illustrated in the figure, are used to hold the panel flat for stowage, as later herein described in greater detail, against the bias force produced by the hinges. As becomes apparent in this description, due to the nature of the panel's construction, the panels would not otherwise be or remain flat under zero gravity conditions.

The panel's upper surface or support 4 is suitably a skeletal structure or framework formed of a thin flexible material defining, as example, four adjacent "picture frames" in structure. The bottom surface is also flat and forms one large rectangular picture frame 6, only the edges of which are visible in the figure, illustrated more clearly in FIG. 3. That large picture frame 6 is covered by a thin flexible membrane 8, partially visible through one of the four windows in upper surface 4. That membrane serves as a support surface for the solar cells 10, only one of which is pictorially illustrated by dash lines, and those solar cells are distributed about the membranes bottom surface in a conventional arrangement, the details of which are not material to an understanding of the present invention.

Continuing with FIG. 2, strain energy type hinges 19a through 19d are located at each of the four corners of the assembly. The panel-to-panel hinges 21a–21d, illustrated generally in FIG. 1, are omitted in the figure.

When deployed, due to the force exerted by hinges 19a–19d, the panel frame changes in shape into the curved configuration better illustrated in FIG. 3 to which reference is made. The upper frame member 4 is outwardly bowed and the lower frame member 6 and accompanying membrane 8 remain essentially flat. In cross-section the panel configuration defines a curved sector, which vaguely resembles the cross section of an airplane wing or the capital letter D. In deploying, strain energy hinges 19a–19d, shown in fully deployed condition, located on the opposite ends of the rectangular shaped flat frame 6, earlier illustrated in FIG. 2, pushes the opposite ends of frame member 4 toward one another a short distance. Being relatively flexible, that frame member bows outwardly.

The panel's 180 degree strain energy hinge 19a is illustrated in greater scale in FIG. 4, illustrating the hinge in the undeployed condition; and again in FIG. 5, in which the hinge is shown deployed. The hinge comprises a thin flexible rectangular metal tape 22 and associated mounting brackets 24 and 26 at the respective ends. As best illustrated in FIG. 5 bracket 24 is bolted to another section underlying the end of the tape 22, clamping the tape between those two sections. The larger square shaped portion of that bracket is bolted to the upper frame member 4 at a location adjacent a corner. At the other end bracket 26 contains a portion attached to the tape 22, bolted to another like portion, not visible in the figure, just as with the corresponding portion of mounting bracket 24. The latter portion also contains a hinged portion 32, illustrated bent over in the figure, which is attached to a corner of lower frame member 6, suitably with screws or adhesive or other conventional means.

Returning to FIG. 4, when the hinge is in its undeployed condition, it is bent into the U-shaped configuration illustrated, storing force in the formed spring 22. In this configuration the strain-energy hinge produces a biasing force to unwrap itself from the U-shape and straighten out to the deployed condition as earlier illustrated in FIG. 5.

Returning again to FIG. 5, in order to accommodate tape 22 when fully straightened as shown, a small corner portion 28 of the upper frame member 4 is cut away, leaving a clearance space for the tape. The foregoing description of one of the hinges is representative of the other like hinges and associated mounting structure at each of the remaining three corners of the panel frame members, which need not be repeated.

The strain energy hinges, also sometimes referred to as tape measure hinges, are of a recognized design. Those who use a metal tape measure are familiar with the metal tape's slightly curved shape, which affords some measure of stiffness along its length and sides. Yet with sufficient applied force the tape resiliently bends over and folds. The tape may be grasped along its length and, with appropriate force, is manually folded over, causing the area about the fold to flex out and flatten. Once that fold is flattened, further folding requires less force. Moreover, when the tape is released, the tape resiliently returns to shape, literally springs back to shape. The tape is both resilient and flexible.

Hinges of the foregoing type have earlier been used on solar arrays and have been previously used on satellites manufactured by the present assignee for deploying solar arrays. When used on solar arrays the hinges are aligned like hinges on a swinging door, the flat solar panel, in essentially the same manner as panel-to-panel hinges 21 in the present invention, later herein described.

Strain energy hinges 19 have the advantage of providing low positive torque during deployment, so that the deployment rate is not excessive, while providing much higher torque during the last few degrees of rotation prior to "latch up", straightening out as illustrated in FIG. 5. The latched stiffness of that hinge is extremely high, relatively speaking, that is, the force required to flatten or kink a metal tape, permitting bending.

When the solar array assembly of FIG. 1 is placed in the stowed condition, the panels of the solar arrays 3 and 5 and box 7 neatly and compactly fold into a small sized package. A portion of one of the corner regions of solar panel 3 is illustrated to larger scale as folded in FIG. 6 to which reference is made.

Figure 6:
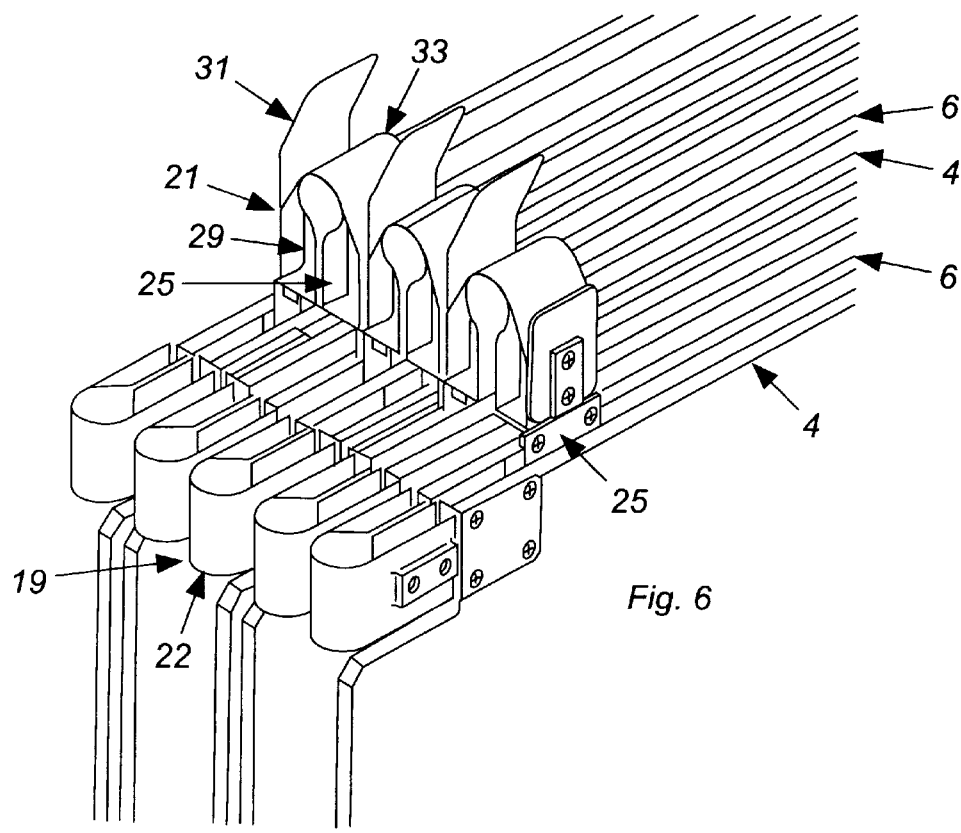
FIG. 6 partially illustrates to larger scale a corner section of the solar array of FIG. 1 as stowed, showing the stacked relationship of the D-panel hinges and the panel-to-panel hinges used to join adjacent panels together in the array.

In FIG. 6, each panel hinge located at the upper left corner of the various panels, including hinge 19b on panel 3, are illustrated to the left in the figure. The hinges are stacked in line. Individually, those hinges appear the same as in FIG. 4. The panel-to-panel hinges, 21, shown in the undeployed condition, are also stacked in another line, and are oriented at right angles to the panel hinges 19. As shown the individual panels, each formed with the pair of members 4 and 6, are folded together in an accordion-like manner. A tie 35 is illustrated holding the panels stacked together, restraining the force of strain energy hinges 19 and 21.

Panel-to-panel hinges 21 are also strain energy hinges. They each contain a metal tape 23, end brackets 25 and 29 for joining the tape to adjacent panels and an over-travel stop 31. In the undeployed condition, the panel-to-panel hinges stores mechanical energy in the bent tape 23, just like the strain-energy hinges earlier described.

When the individual solar panels are untied for deployment, such as by the astronaut cutting tie 35 as example, the energy in those hinges is released, and the hinge's metal tape thereby straightens out. In so doing the panel-to-panel hinge along the side of a solar panel unfolds a panel from its position facing a side of an adjacent panel and lays it alongside the latter. That action occurs with each of the solar panels. Those solar panels lay alongside one another along a common axis, thereby forming the deployed solar array. This panel-to-panel hinge and its use in tying adjacent panels together in an array is the same as used in the prior flat panel solar array construction. And, simultaneously with the opening of the panel-to-panel hinges 21, the four 180 degree strain energy hinges 19a–19d associated with each panel configure the upper surface of the associated panels into the curved shape earlier described. This final relationship is illustrated with respect to one of the panels in an enlarged view in FIG. 7 to which reference is made.

Figure 7:
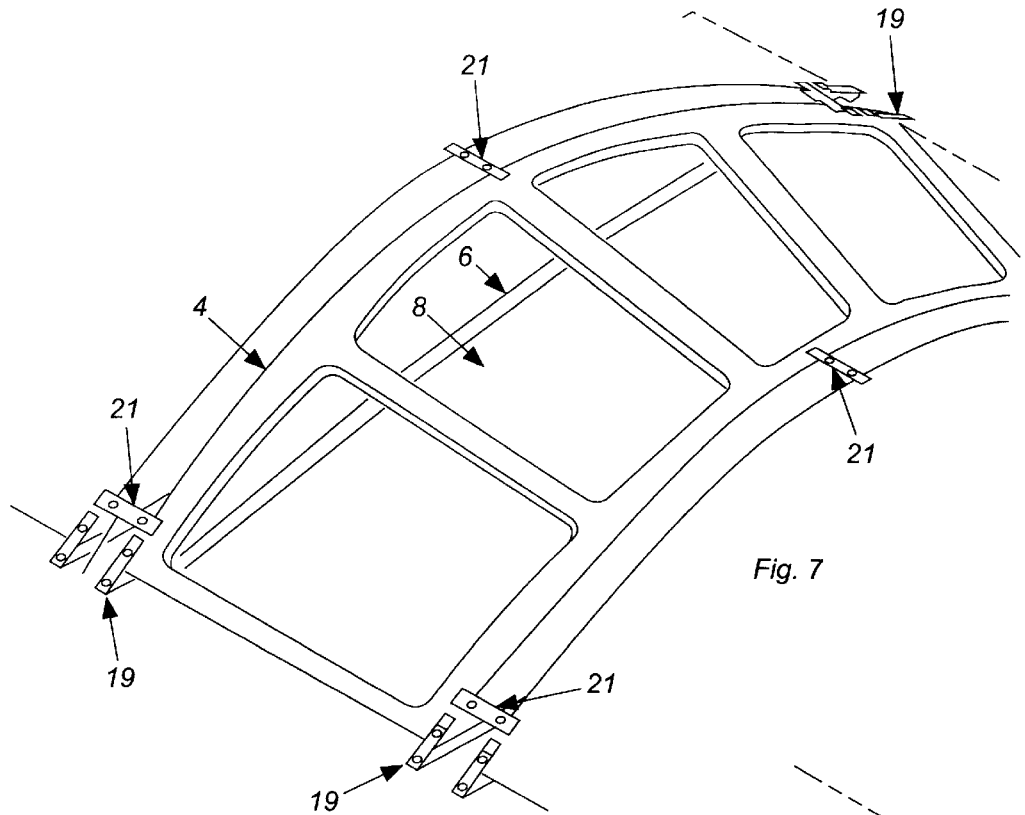
FIG. 7 is an enlarged partial section view of a portion of the solar array of FIG. 1, illustrating the panel-to-panel hinges as deployed.

FIG. 7 illustrates a portion of one of the solar arrays of FIG. 1 in perspective and in a larger scale to better illustrate both the configuration of the panel hinges 19 and the panel-to-panel hinges 21 in the deployed condition.

Figure 8:
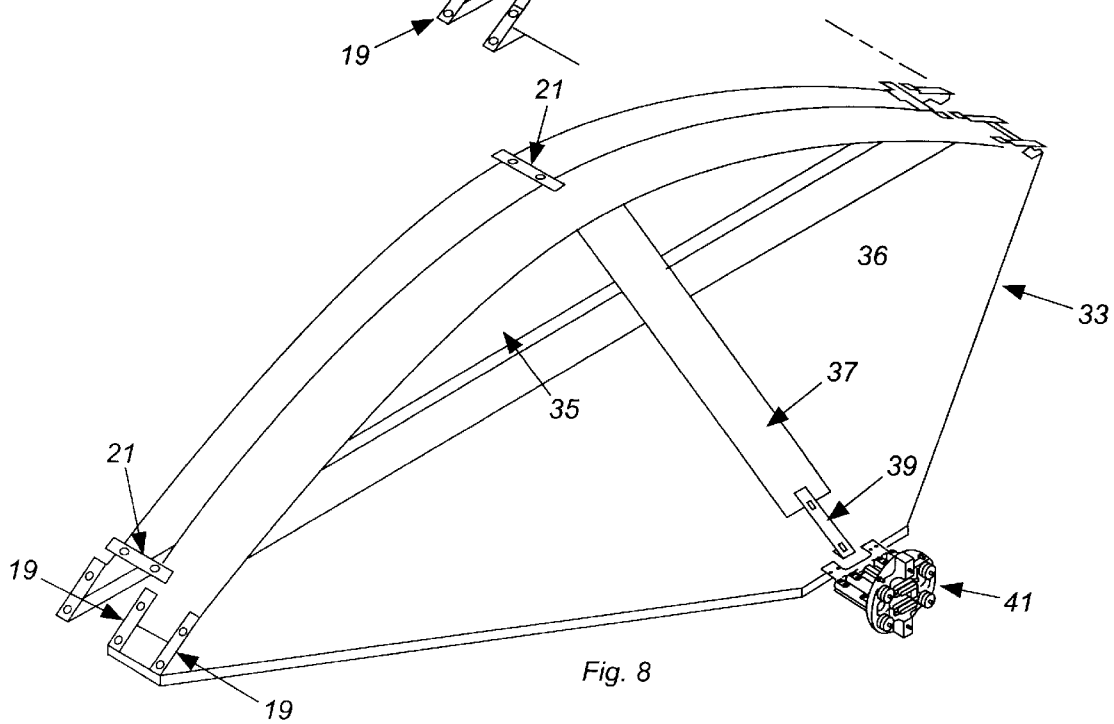
FIG. 8 is another enlarged partial section view of a portion of the solar array of FIG. 1, illustrating the space craft connected end of one of the solar arrays as deployed including the array's transition arm.
Figure 9:
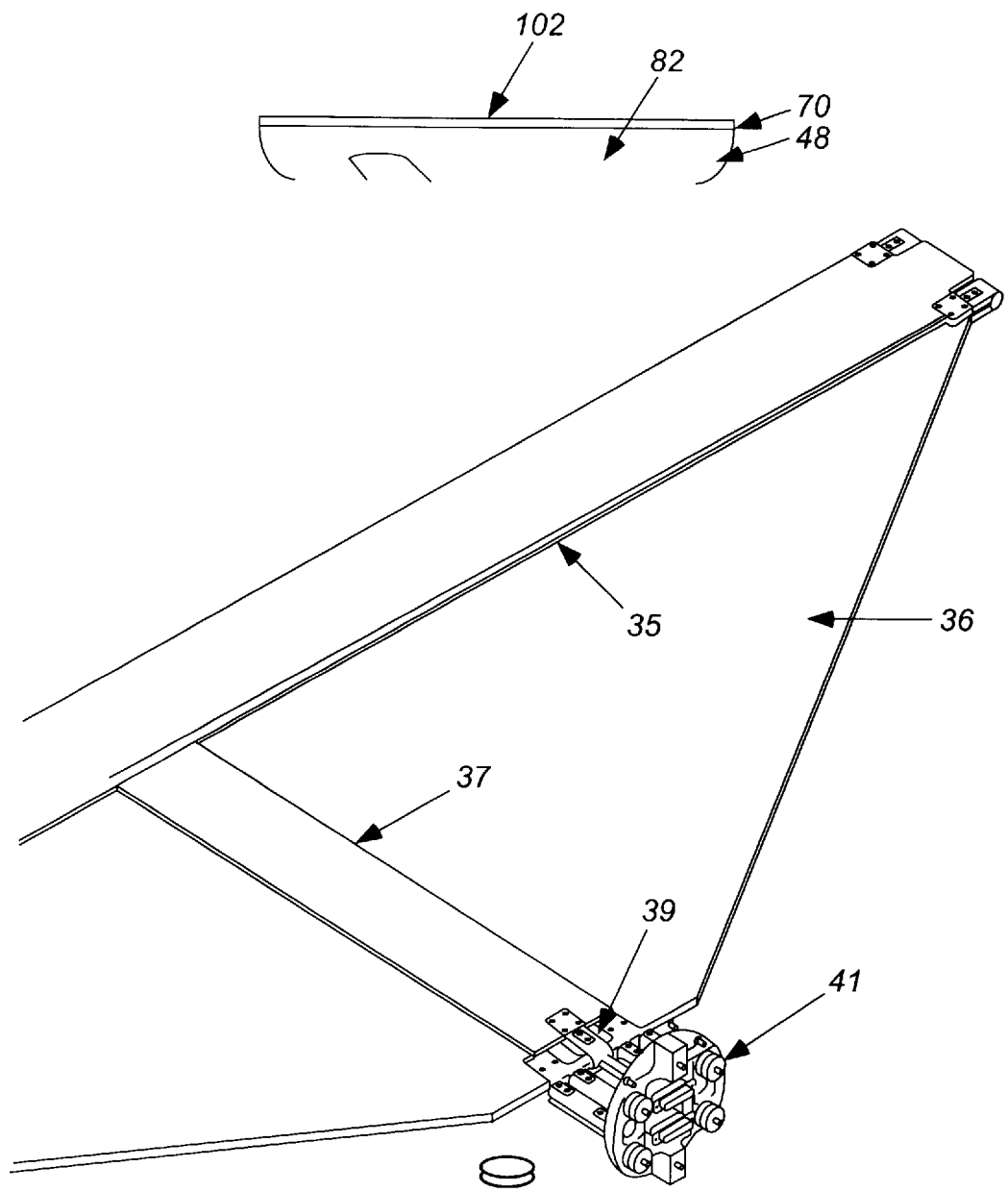
FIG. 9 is a enlarged partial section view of a portion of the solar array of FIG. 1, illustrating the array's transition arm in the stowed condition.

For completeness, the yoke that attaches an end of the solar array to box 7, earlier illustrated in FIG. 1, is next considered. Reference is made to FIG. 8, partially illustrating an end of the solar array, including the yoke, in perspective as deployed; and to FIG. 9, illustrating the yoke elements of FIG. 8 in perspective in the stowed or undeployed condition. The yoke 33 includes a surface 35 formed of flexible material, which can be bowed outwardly as illustrated, a triangular shaped flat surface 36, a transition arm 37, strain energy hinge 39, and a root hinge 41, a hinge that connects the solar array wing to the base drive motor.

As illustrated in FIG. 9, surface 35 is flattened down in the undeployed condition, by the same means used to flatten down the curved surfaces in the array previously described. That surface and transition arm 37 are pressed flat against the triangular shaped bottom surface 36, compressing strain energy hinge 39. In that undeployed condition, surface 35 overlies a portion of triangular surface 36. When the array is to be deployed the package is untied, removing the restraint from hinge 39 and hinges 21. Hinge 39 rotates transition arm 37 upward in the figure and the hinges at the corners of surface 35 push the ends of the member inwardly, causing member 35 to bow outwardly. The latter is the same action described for the solar panels. The yoke thus assumes the deployed condition illustrated in FIG. 8.

The flat shape to the solar panels, such as illustrated earlier in FIG. 2 is accomplished with an external force, manually as part of the packing procedure implemented by the technician. As example, by pressing down on the flexible support panel, the technician can overcome the bias force of the 180 degree strain energy hinges and compress those spring hinges back to their cocked position, while flattening the support panel. Each of the separate panels in the array of FIG. 1 is packed by manually folding the panels over one another in an accordion-like zig-zag fashion and pressing them together, whereby the individual panels are flattened down against the opposing biasing force exerted by the 180 degree strain energy hinges and the panels are held in the folded condition against the biasing force of the panel-to-panel strain energy hinges. To retain the panels in that stowed condition, a tie-down 35, illustrated in FIG. 6, or other like restraint is employed. When that tie-down is removed to deploy the solar array, the panel-to-panel hinges 21 push the panels away from one another to unfold them in line as illustrated in FIG. 1 while the spring energy hinges 19 push opposite ends of the panel toward one another, causing the frame member to outwardly bow.

In a practical embodiment of the invention, the frame members 3 and 4 are preferably constructed graphite face sheet aluminum honeycomb sandwich material. The preferred form of membrane 8 used to cover that frame member 6 is a "drumskin" tensioned Kapton film. That film is pretensioned in both directions in-plane, while it is bonded at elevated temperatures, about 350 degrees F., to a picture frame style frame constructed from graphite facesheet aluminum honeycomb sandwich construction. Upon cooling from that elevated temperature, the "heat shrink" attachment of the membrane to the frame is completed. The resulting pre-stress should be about 33% of yield and 12% of its ultimate breaking point. An ideal film for the application is that currently marketed under the brand name "Kapton JP" and is attached to the frame with a 350 degree F. curing film adhesive.

The bottom framework 6 is designed to possess a greater "beam yield" than framework or surface 4 and greater stiffness. When the spring hinge releases its force there is an action and a reaction as well. But the bottom frame 6, formed of aluminum honeycomb material and being of sufficient stiffness, resists the force exerted at the other end of the spring and does not bend.

The solar cells are formed of semiconductor material and are of conventional structure and assembly. In the past those cells have been formed on a thin pliant flexible film base that forms the support, the solar panel. The same construction is used with the present invention, using membrane 8 as the base for the cells. The construction details of those prior cell supports are not further described, since they are not necessary to the understanding of the present invention and are known to those skilled in that field of endeavor. The interested reader is referred to the technical and patent literature for those details.

The structural inertia of a body is its cross-section area multiplied by the distance to the centroid raised to the second power. In transforming from a flat shape of thin cross section to a larger body of significant greater cross section, such as the D-shape, the body's inertia increases substantially. Essentially the 180 degree strain energy hinges 19 transform the moment of inertia of the solar panel from a low moment of inertia in which the panels are held flat to a significantly greater moment of inertia, accomplishing that by squeezing the opposite ends of a panel together to outwardly bow the panel and thereby change the cross-section of the geometric figure formed by the pair of panels. The tremendous increase in deployed inertia of the membrane's cross section allows the "D-Wing" to behave as a rigged cantilevered wing that, typically, is required to possess a deployed fundamental frequency of anywhere from 0.10 Hz to 0.5 Hz.

The foregoing embodiment mounts the solar cells to the flat side of the panels. As those skilled in the art appreciate, in alternative embodiments it is also possible to mount the solar cells on the curved side of the panel.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a solar panel the combination comprising:

a first support member defining a first flat surface;

a second support member defining a second flat surface;

said second support member being substantially coextensive in area with said first support member and overlying said first support member;

said second support member being flexible in characteristic;

said first support member possessing a stiffness characteristic greater than the corresponding stiffness characteristic of said second support member;

biasing means carried by said first support member for pushing opposite ends of said second support member toward one another to outwardly bow said second support member.

2. The combination as defined in claim 1, further comprising:

releaseable restraining means for pressing said second support member against said first support member against said pushing of said biasing means to eliminate said bow of said second support member.

3. The combination as defined in claim 1, wherein said biasing means comprises at least one 180 degree strain energy hinge.

4. The combination as defined in claim 1, wherein each of said said first and second support members are rectangular in geometry and contain four corners; and wherein said biasing means further comprises: four 180 degree strain energy hinges; each of said 180 degree strain energy hinges being carried at a respective one of said four corners of said first support member and being connected to a corresponding one of said corners of said second support member.

5. The combination as defined in claim 1, further comprising:

a plurality of solar cells disposed on and about one of said first and second support members.

6. The combination as defined in claim 5, wherein each of said said first and second support members are rectangular in geometry and contain four corners; and wherein said biasing means further comprises: four 180 degree strain energy hinges; each of said 180 degree strain energy hinges being carried at a respective one of said four corners of said first support member and being connected to a corresponding one of said corners of said second support member.

7. The combination as defined in claim 6, wherein said first flat surface includes a membrane, said membrane comprising a drumskin tensioned Kapton™ film.

8. The combination as defined in claim 7, further comprising:

releaseable restraining means for pressing said second support member against said first support member against said pushing of said biasing means to eliminate said bow of said second support member.

9. The combination as defined in claim 1, wherein said first flat surface includes a membrane, said membrane comprising a drumskin tensioned Kapton™ film.

10. A solar array comprising:

a plurality of solar panels;

each of said solar panels comprising:

a first support member defining a flat surface;

a second support member defining a flat surface;

said second support member being substantially coextensive in area with said first support member and overlying said first support member;

said second support member being flexible in characteristic;

said first support member possessing a stiffness characteristic greater than the corresponding stiffness characteristic of said second support member; and biasing means carried by said first support member for pushing opposed ends of said second support member toward one another a predetermined distance to cause said second support member to bow outwardly.

11. The solar array as defined in claim 10, further comprising:

a plurality of strain energy hinge means for connecting said solar panels together in a line, said strain energy hinge means permitting said solar panels to be folded over one another for stowage and for unfolding said solar panels upon deployment.

12. The solar array as defined in claim 11, further comprising:

releaseable restraining means for holding each of said plurality of solar panels folded over one another for storage and for pressing said second support member of each solar panel against said first support member thereof to restrain the respective biasing means associated with said solar panel and flatten said bow in said second support member.

13. The solar array as defined in claim 12, wherein each of said said first and second support members are rectangular in geometry and contain four corners; and wherein said biasing means further comprise: four 180 degree strain energy hinges; each said 180 degree strain energy hinge being carried at a respective one of said four corners of said first support member and being connected to a corresponding corner of said second support member.

14. The solar array as defined in claim 13, further comprising:
a plurality of solar cells disposed on and about one of said first and second support members.

15. The solar array as defined in claim 14, wherein said first support member includes a membrane, said membrane comprising is a "drumskin" tensioned Kapton™ film.

16. The solar array as defined in claim 10, wherein said biasing means comprises at least one 180 degree strain energy hinge.

17. The solar array as defined in claim 10, wherein each of said said first and second support members are rectangular in geometry and contain four corners; and wherein said biasing means further comprise: four 180 degree strain energy hinges; each said 180 degree strain energy hinge being carried at a respective one of said four corners of said first support member and being connected to a corresponding corner of said second support member.

18. The solar array as defined in claim 10, further comprising:
a plurality of solar cells disposed on and about one of said first and second support members.

19. The solar array as defined in claim 10, wherein said first support member includes a membrane, said membrane comprising is a "drumskin" tensioned Kapton™ film.

* * * * *